(12) United States Patent
Kase

(10) Patent No.: US 8,861,153 B2
(45) Date of Patent: Oct. 14, 2014

(54) CURRENT DIFFERENTIAL REPLAY APPARATUS

(75) Inventor: Takahiro Kase, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 111 days.

(21) Appl. No.: 13/807,850

(22) PCT Filed: Jun. 29, 2011

(86) PCT No.: PCT/JP2011/003711
§ 371 (c)(1),
(2), (4) Date: Dec. 31, 2012

(87) PCT Pub. No.: WO2012/001964
PCT Pub. Date: Jan. 5, 2012

(65) Prior Publication Data
US 2013/0120888 A1 May 16, 2013

(30) Foreign Application Priority Data
Jun. 30, 2010 (JP) .................. 2010-149341

(51) Int. Cl.
*H02H 3/26* (2006.01)
*H02H 3/28* (2006.01)
*H02H 7/26* (2006.01)

(52) U.S. Cl.
CPC ............. *H02H 3/26* (2013.01); *H02H 3/283* (2013.01); *H02H 7/26* (2013.01)
USPC ........................................................ 361/63

(58) Field of Classification Search
USPC ........................................................ 361/63
See application file for complete search history.

(56) References Cited

U.S. PATENT DOCUMENTS

| 4,530,025 | A | * | 7/1985 | Usui ............................. 361/87 |
| 4,689,710 | A | * | 8/1987 | Anzai ........................... 361/87 |
| 4,825,326 | A | * | 4/1989 | Andow et al. ................ 361/63 |

FOREIGN PATENT DOCUMENTS

| JP | 7 46748 | 2/1995 |
| JP | 2000 224755 | 8/2000 |
| JP | 2002 17037 | 1/2002 |

OTHER PUBLICATIONS

English Machine translation of JP-2002017037A, PCM Carrier Relay, Oda, Shigeto, 2002.*
International Search Report Issued Sep. 27, 2011 in PCT/JP11/03711 Filed Jun. 29, 2011.

* cited by examiner

*Primary Examiner* — Jared Fureman
*Assistant Examiner* — Kevin J Comber
(74) *Attorney, Agent, or Firm* — Oblon, Spivak, McClelland, Maier & Neustadt, L.L.P.

(57) ABSTRACT

A current differential relay apparatus includes a ratio-differential-characteristic determining unit determining an operation in a ratio differential characteristic based on an operation level Id and a suppression level Ir, a first-current-range determining unit determining that it is activated when $Id > a_1 Ir + b_1$ is satisfied, a second-current-range determining unit determining that it is activated when $Id > a_2 Ir + b_2$ is satisfied with relationships $a_1 \leq a_2$ and $b_1 \geq b_2$ being satisfied where $a_1$, $a_2$, $b_1$ and $b_2$ are real numbers, and an AND operator, a reset unit, and a flip flop which determine that it is an operation in a ratio differential characteristic when both first and second current ranges are activated, and which continue the operation until an operation in the first range is reset.

16 Claims, 16 Drawing Sheets

- PRIOR ART -

CURRENT DIFFERENTIAL REPLAY APPARATUS

FIELD

Embodiments of the present invention relate to a current differential relay apparatus for protecting power lines.

BACKGROUND

Current differential relay apparatuses for protecting power lines are apparatuses that recognize and detect with high sensitivity an internal fault or an external fault in a section subjected to a protection using a current of each terminal of the power line. Example configuration of a current differential relay apparatus and ratio differential characteristic thereof will be explained with reference to FIG. 16. That is, a current differential relay apparatus 100, includes an input unit 110, a receiver unit 120, a computing unit 130, an operation-level calculating unit 140, a suppression-level calculating unit 150, and ratio-differential-characteristic determining unit 160.

The current differential relay apparatus 100 as explained above recognizes an internal fault or an external fault as follows. First of all, the computing unit 130 calculates an electrical quantity based on a local-terminal current input from the input unit 110 and an opposing-terminal current from a counterpart terminal received by the receiver unit 120. The operation-level calculating unit 140 obtains a vector sum of the currents of respective terminals as an operation level Id based on the calculated electrical quantity, and the suppression-level calculating unit 150 calculates a scalar sum of the currents of the respective terminals as a suppression level Ir. The ratio-differential-characteristic determining unit 160 determines activation/deactivation of the ratio differential characteristic based on the operation level Id and the suppression level Ir.

FIG. 16 illustrates a two-terminal system and the current differential relay apparatus at a terminal A with functional blocks in order to simplify the explanation. The operation level Id remains same in the case of the systems of equal to or greater than three terminals, but the suppression level Ir is obtained based on the scalar sum of the currents of respective terminals.

As illustrated in FIG. 16, the ratio differential characteristic is defined by a set of two characteristics: a small-current range characteristic Df1; and a large-current range characteristic Df2. The small-current range characteristic Df1 is a characteristic for enabling detection even if the fault current is small when an internal fault occurs. The large-current range characteristic Df2 is a characteristic for avoiding an operation at an increased error current of a current transformer (hereinafter, referred to as a CT) when a large current flows through at the time of an external fault. In the illustrated case, when both small-current range characteristic Df1 and large-current range characteristic Df2 are activated, it becomes an output by the current differential relay apparatus 100. (Japanese Patent Application Publication No. 2002-17037 and JP 2000-224755 A)

Regarding the above-explained large-current range characteristic Df2, it is necessary to shift such a characteristic to the right to some level in consideration of the maximum load current, thereby expanding the operation range. Accordingly, when a CT which is saturated even if a current is small is used, a saturation occurs in the small-current range, which may be an unnecessary operation. Conversely, if the large-current range is excessively narrowed down, when the CT is saturated due to an internal fault, or when an internal fault bringing about a resistance occurs, an operation may become unstable.

An embodiment provides a current differential relay apparatus which includes: an operation-level calculating unit that calculates an operation level Id which is a vector sum of a local-terminal current and a received opposing-terminal current; a suppression-level calculating unit that calculates a suppression level Ir which is a scalar sum of the local-terminal current and the opposing-terminal current; and a ratio-differential-characteristic determining unit that determines an operation in a ratio differential characteristic based on the operation level Id and the suppression level Ir, and which further has following technical features.

(1) With relationships $a_1 \leq a_2$ and $b_1 \geq b_2$ being satisfied where $a_1$, $a_2$, $b_1$ and $b_2$ are real numbers, a first range determining unit which determines that a first range is activated when $Id > a_1 Ir + b_1$ is satisfied; a second range determining unit which determines that a second range is activated when $Id > a_2 Ir + b_2$ is satisfied.

(2) An operation determining unit which determines that an operation is made in the ratio differential characteristic when both first range and second range are activated and which continues the operation until an operation in the first range is reset.

Another embodiment provides a current differential relay apparatus which includes: an operation-level calculating unit that calculates an operation level which is a vector sum of a local-terminal current and a received opposing-terminal current; a suppression-level calculating unit that calculates a suppression level which is a scalar sum of the local-terminal current and the opposing-terminal current; and a first ratio-differential-characteristic determining unit that determines an operation in a ratio differential characteristic based on a first relational expression, and which further includes following technical features.

(1) A maximum-terminal-current selecting unit that selects a current value of a maximum-current terminal among terminals including the local terminal.

(2) A change-level determining unit which determines that a change level of the current value of the maximum-current terminal selected by the maximum-terminal-current selecting unit is equal to or greater than a predetermined value.

(3) A second ratio-differential-characteristic determining unit that determines an operation in a ratio differential characteristic based on a second relational expression.

(4) An external fault determining unit that determines an occurrence of an external fault based on determination results by the change-level determining unit and the second ratio-differential-characteristic determining unit.

(5) The first ratio-differential-characteristic determining unit includes a plurality of ratio differential characteristics with different difficulties for an operation changed in accordance with a determination result by the external fault determining unit.

Another embodiment provides a current differential relay apparatus which includes: an operation-level calculating unit that calculates an operation level which is a vector sum of a local-terminal current and a received opposing-terminal current; a suppression-level calculating unit that calculates a suppression level which is a scalar sum of the local-terminal current and the opposing-terminal current; and a first ratio-differential-characteristic determining unit that determines an operation in a ratio differential characteristic based on a first relational expression, and which further includes following technical features.

(1) A maximum-terminal-current selecting unit that selects a current value of a maximum-current terminal among terminals including the local terminal.

(2) A change-level determining unit which determines that a change level of the current value of the maximum-current terminal selected by the maximum-terminal-current selecting unit is equal to or greater than a predetermined value.

(3) A second ratio-differential-characteristic determining unit that determines an operation in a ratio differential characteristic based on a second relational expression.

(4) An external fault determining unit that determines an occurrence of an external fault based on determination results by the change-level determining unit and the second ratio-differential-characteristic determining unit.

(5) An operation-level determining unit that determines a magnitude relation between the current value of the maximum-current terminal and the operation level.

(6) The first ratio-differential-characteristic determining unit includes a plurality of ratio differential characteristics with different difficulties for an operation changed in accordance with a determination result by the external fault determining unit or a determination result by the operation-level determining unit.

DETAILED DESCRIPTION

[1. First Embodiment]
[1-1. Configuration]

Figure 1:
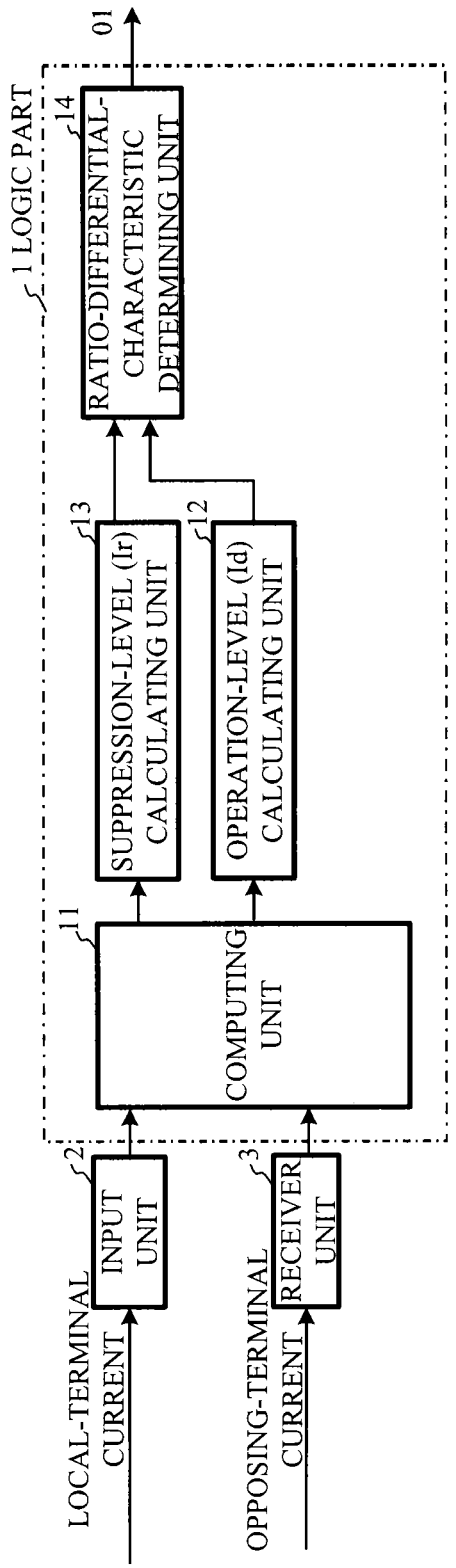
FIG. 1 is a block diagram illustrating a logic part of a current differential relay apparatus according to a first embodiment.
Figure 2:
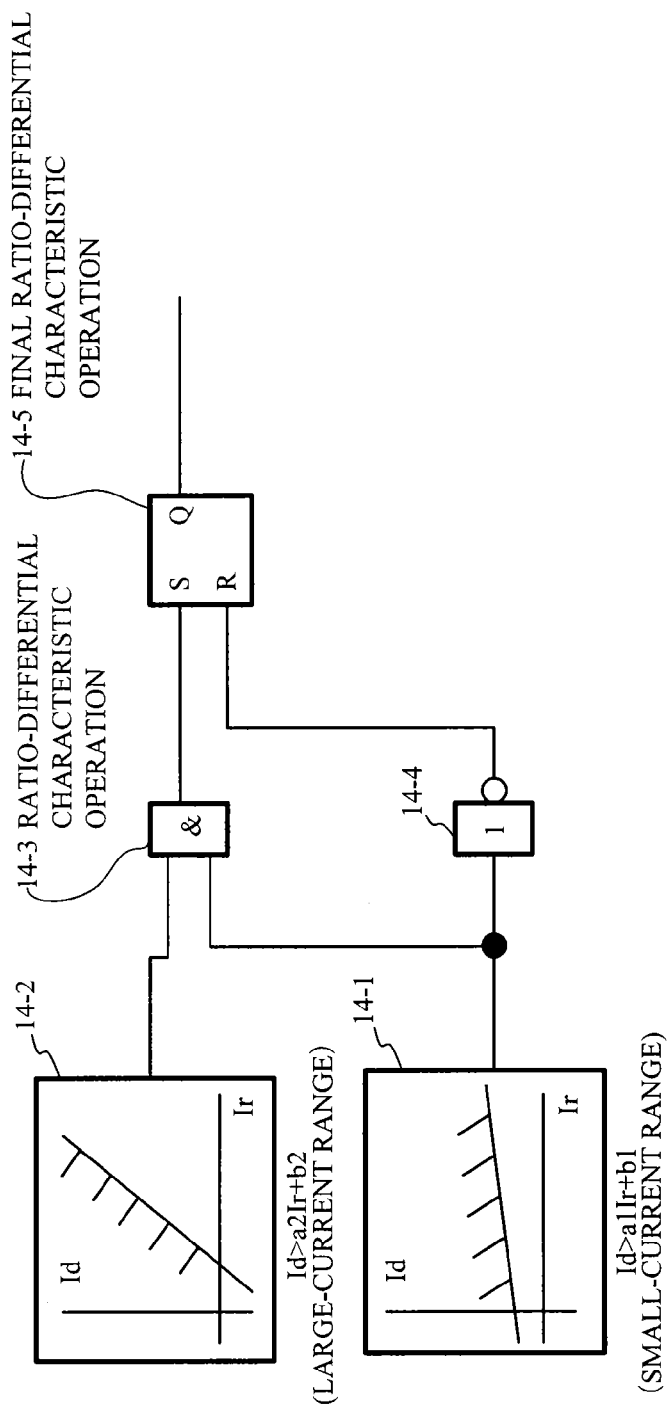
FIG. 2 is a block diagram illustrating a ratio-differential-characteristic determining unit 14 in the logic part in FIG. 1.

An explanation will be given of a first embodiment with reference to FIG. 1 and FIG. 2. That is, this embodiment employs a configuration including, as illustrated in FIG. 1, a logic part 1, an input unit 2, and a receiver unit 3. The logic part 1 is a part that functions as a current differential relay apparatus by the operations of the respective units to be discussed later.

The input unit 2 is means for inputting a local-terminal current from a CT, etc., at a local terminal side provided at a power line. More specifically, the input unit 2 has functions of performing, for example, digitalization and filtering on the received local-terminal current. The receiver unit 3 is means for receiving an opposing-terminal current from a counterpart terminal via a communication line. The opposing-terminal current to be received is subjected to digitalization and filtering, etc., by the input unit 2, etc., of the counterpart terminal.

The logic part 1 includes a computing unit 11, an operation-level calculating unit 12, a suppression-level calculating unit 13, and a ratio-differential-characteristic (RDC) determining unit 14, etc. The computing unit 11 is means for calculating various basic electrical quantities (electrical quantities necessary for obtaining a scalar sum of currents of respective terminals and a vector sum thereof to be discussed later) based on the local-terminal current input by the input unit 2 and the opposing-terminal current received by the receiver unit 3.

The operation-level calculating unit 12 is means for calculating an operation level Id that is a vector sum of currents of respective terminals based on the basic electrical quantity obtained by the computing unit 11. The suppression-level calculating unit 13 is means for calculating a suppression level Ir that is a scalar sum of currents of respective terminals. The ratio-differential-characteristic determining unit 14 is provided at the output side of the operation-level calculating unit 12 and that of the suppression-level calculating unit 13. The ratio-differential-characteristic determining unit 14 is means for determining a ratio differential characteristic, and outputting an operation signal of a relay based on the operation level Id and the suppression level Ir.

A determination by the ratio-differential-characteristic determining unit 14 of this embodiment is established based on a combination of plural characteristics, and is typically a combination of two characteristics. That is, as illustrated in FIG. 2, the ratio-differential-characteristic determining unit 14 includes a fist-current-range determining unit 14-1, a second-current-range determining unit 14-2, an AND operator 14-3, a reset unit 14-4, and a flip flop 14-5, etc.

The first-current-range determining unit 14-1 is a circuit that checks whether or not $Id > a_1 Ir + b_1$ is satisfied. The second-current-range determining unit 14-2 is a circuit that checks whether or not $Id > a_2 Ir + b_2$ is satisfied. In general, $a_1 \leq a_2$ and $b_1 \geq b_2$ are satisfied, the first current range (area) is called a small-current range, while the second current range (area) is called a large-current range.

The AND operator 14-3 is a circuit that operates in the ratio differential characteristic when the first-current-range determining unit 14-1 determines that the condition is satisfied and the second-current-range determining unit 14-2 determines that the condition is satisfied. The reset unit 14-4 is a circuit that inverts an output by the first-current-range determining unit 14-1. That is, the reset signal output by the reset unit 14-4 becomes ON when no operation is performed in the first current range. The flip flop 14-5 is a circuit that keeps outputting unless the reset signal is supplied from the reset unit 14-4 once activated by an input from the AND operator 14-3.

[1-2. Working and Advantage]

Next, the working and advantage of this embodiment explained above will be explained. That is, the computing unit 11 calculates an electrical quantity based on data on the local terminal and data on the counterpart terminal from the input unit 2 and the receiver unit 3, respectively.

Next, the suppression-level calculating unit 13 calculates the suppression level Ir that is a scalar sum obtained by adding the current level of the local terminal and that of the counterpart terminal. Moreover, the operation-level calculating unit 12 calculates an operation level Id that is the vector sum of the level of the local terminal and that of the counterpart terminal. The ratio-differential-characteristic determining unit 14 calculates a ratio differential characteristic based on the obtained operation level Id and suppression level Ir, and outputs a relay operation signal 01 when a condition is satisfied. The operation signal 01 may be used for other logics, but is typically used as a trip signal for a breaker.

In the calculation by the ratio-differential-characteristic determining unit 14, as explained above, first, the first-current-range determining unit 14-1 determines whether or not $Id > a_1 Ir + b_1$ is satisfied, and the second-current-range determining unit 14-2 determines whether or not $Id > a_2 Ir + b_2$ is satisfied. When both conditions are satisfied, the AND operator 14-3 operates in the ratio differential characteristic. The flip flop 14-5 keeps outputting once activated by an input from the AND operator 14-3 unless a reset signal is supplied from the reset unit 14-4.

As a result, when both small-current range and large-current range are activated, and the ratio-differential-characteristic determining unit 14 once determines as activated, a final ratio differential characteristic is continuously output unless the characteristic in the small-current range is reset. Hence, when a CT saturation occurs because of an internal fault and the operation in the large-current range is temporally reset, a final relay output can be continuously output stably, thereby suppressing a breakdown, etc., of an apparatus beforehand.

[2. Second Embodiment]

[2-1. Configuration]

Figure 3:
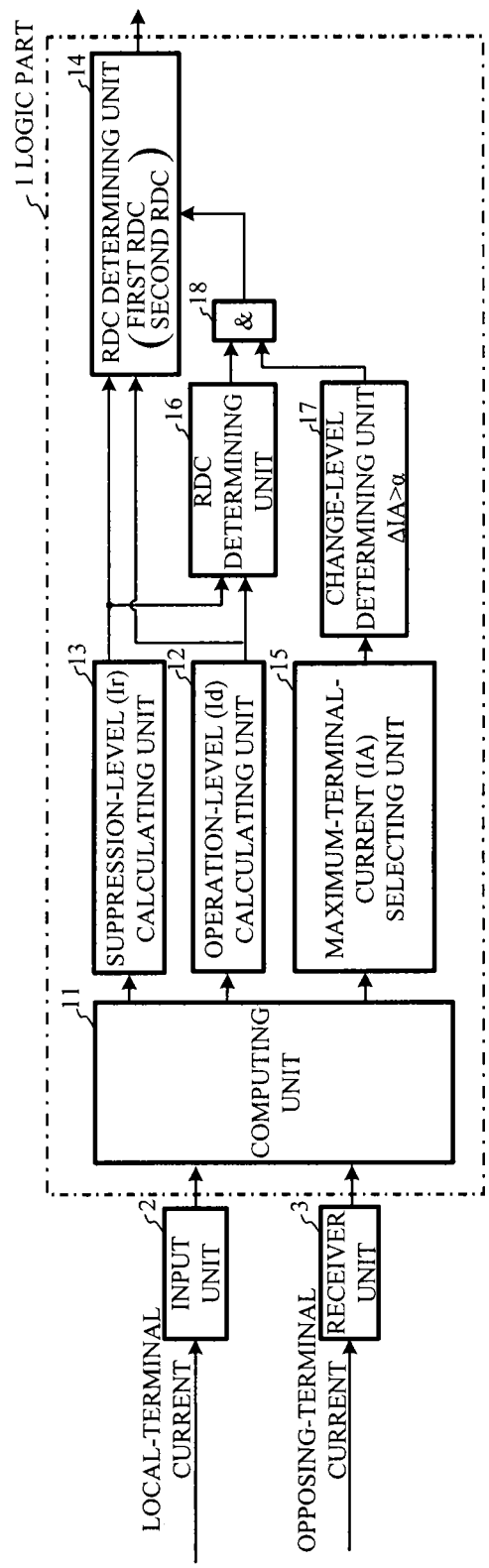
FIG. 3 is a block diagram illustrating a logic part of a current differential relay apparatus according to a second embodiment.
Figure 4:
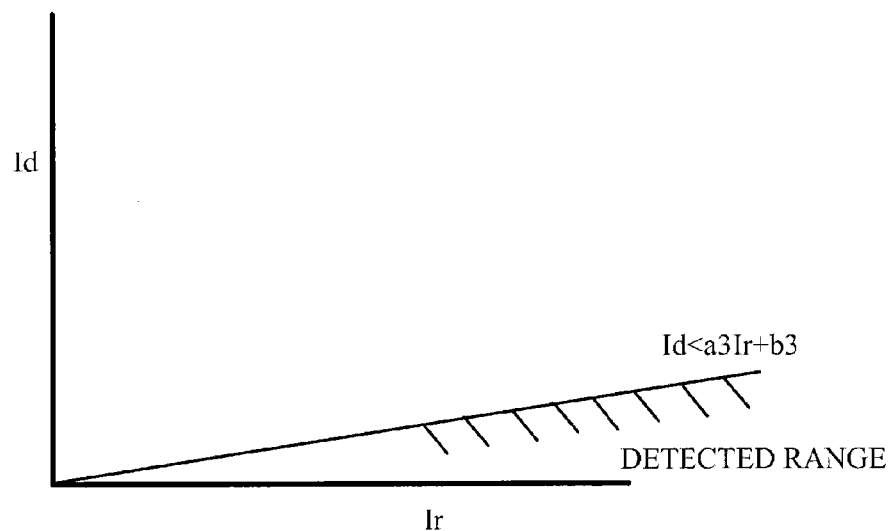
FIG. 4 is an explanatory diagram illustrating an example ratio differential characteristic of a ratio-differential-characteristic determining unit 16 in the logic part in FIG. 3.
Figure 5:
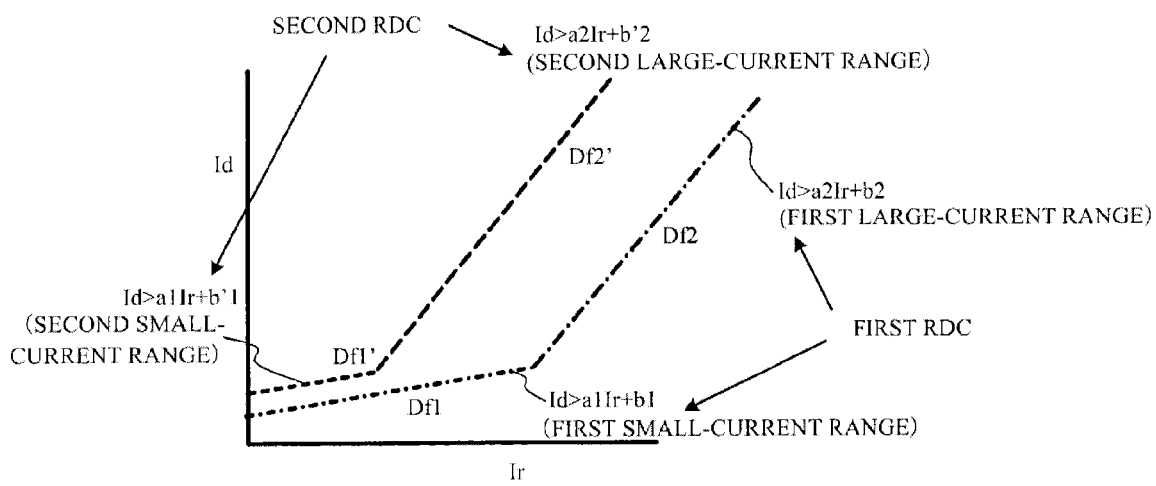
FIG. 5 is an explanatory diagram illustrating an example ratio differential characteristic of the ratio-differential-characteristic determining unit 14 in the logic part in FIG. 3.

A second embodiment will now be explained with reference to FIGS. 3 to 5. This embodiment basically employs the same configuration as that of the first embodiment illustrated in FIG. 1. However, this embodiment differs where it includes a maximum-terminal-current selecting unit 15, ratio-differential-characteristic (RDC) determining unit 16, a change-level determining unit 17, and an AND operator 18. Moreover, the feature of this embodiment is that the ratio-differential-characteristic determining unit 14 can change two characteristics to be discussed later.

First, the maximum-terminal-current selecting unit 15 is means for comparing the current of the local terminal with the current of the counterpart terminal, finding a terminal where the maximum current is flowing, and obtaining a current value thereof. The ratio-differential-characteristic determining unit 16 is means for determining a ratio differential characteristic separately from the ratio-differential-characteristic determining unit 14, and has a function of detecting that the operation level is equal to or smaller than a certain value. For example, it may have a characteristic illustrated in FIG. 4, and have a function of checking whether or not $Id < a_3 Ir + b_3$ is satisfied. In this case, $a_3$ and $b_3$ are real numbers.

The change-level determining unit 17 is means for determining whether or not a change level $\Delta IA$ of the maximum current obtained by the maximum-terminal-current selecting unit 15 is equal to or greater than a certain value. It becomes possible to detect that a fault occurs in the system through the change-level determining unit 17. The AND operator 18 is means for performing a calculation that is satisfied when a fault occurs in the system and the operation level is small. It becomes possible to detect that the occurred fault is an external fault through the AND operator 18 (an external fault detecting unit). When a CT is saturated, it takes a time until the CT starts saturating, and no differential current is produced in that time part. According to this embodiment, however, the AND operator 18 makes it possible to detect an external fault in a period from the occurrence of the external fault to the occurrence of the saturation of the CT.

The ratio-differential-characteristic determining unit 14 is configured by combining two ratio differential characteristics: a first current range characteristic; and a second current range characteristic. FIG. 5 illustrates a specific example. That is, as is exemplified in the first embodiment, the ratio differential characteristic typically includes a large-current range and a small-current range. The ratio-differential-characteristic determining unit 14 of this embodiment is configured by combining the two ratio differential characteristics (first ratio differential characteristic and second ratio differential characteristic): the large-current range; and the small-current range.

It is presumed that the first ratio differential characteristic is a small-current range $Id > a_1 Ir + b_1$ and a large-current range $Id > a_2 Ir + b_2$. Moreover, it is presumed that the second ratio differential characteristic is a small-current range $Id > a_1 Ir + b'_1$ and a large-current range $Id > a_2 Ir + b'_2$. In FIG. 5, the first ratio differential characteristic is shifted rightward of the second ratio differential characteristic, and has an operation range widespread.

[2-2. Working and Advantage]

According to this embodiment explained above, the ratio-differential-characteristic determining unit 14 determines that an external fault occurs when an output by the AND operator 18 becomes ON, and switches the ratio differential characteristic from the first ratio differential characteristic to the second ratio differential characteristic, thereby making the operation difficult. At this time, $b'_1 > b_1$ or $b'_2 > b_2$ is satisfied. Alternatively, with respect to $a_1$ and $a_2$, the same setting can be made.

As explained above, according to this embodiment, a fault is detected based on the change level $\Delta IA$ that is the magnitude of the current value IA at the maximum current terminal, and it is detected that the detected fault is an external fault since the operation level Id is equal to or smaller than a certain value relative to the suppression level Ir. Hence, by changing the ratio differential characteristic to the second ratio differential characteristic that makes the operation difficult in comparison with the normal case, it becomes possible to suppress an unnecessary operation even if the CT is saturated by the external fault.

[3. Third Embodiment]

[3-1. Configuration]

Figure 6:
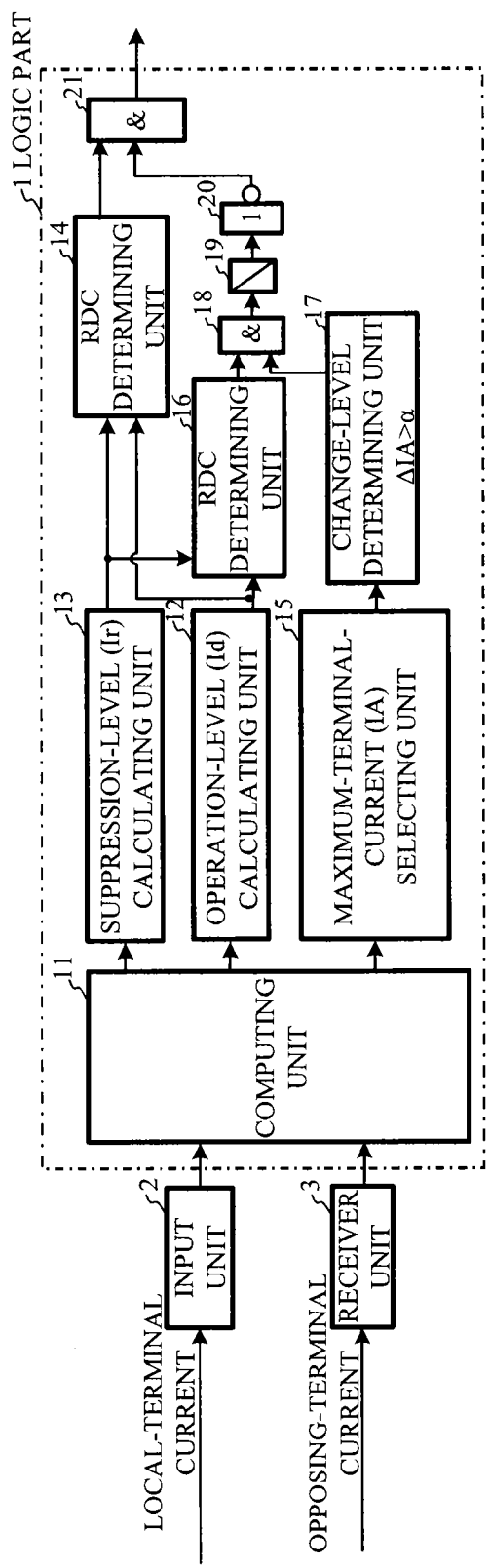
FIG. 6 is a block diagram illustrating a logic part of a current differential relay apparatus according to a third embodiment.

An explanation will be given of a third embodiment with reference to FIG. 6. This embodiment basically employs the same configuration as that of the second embodiment illustrated in FIG. 3. However, this embodiment differs where the logic part includes a delay timer unit 19, an inverted logic unit 20, and an AND operator 21. Those units configure a suppressing unit.

The delay timer unit 19 is means for delaying, when it is detected that a fault is an external fault and the result of the AND operator 18 becomes ON, the result for a certain time period. The inverted logic unit 20 is means for setting, when the external fault is detected, an output to be 0 for a certain time period. The AND operator 21 is means for performing an AND calculation on the inverted logic unit 20 and the ratio-differential-characteristic determining unit 14.

[3-2. Working and Advantage]

According to this embodiment explained above, since the logic part includes the delay timer unit 19 and the inverted logic unit 20, once an external fault is detected, the AND operator 21 is not satisfied for a certain time period. Hence, even if the ratio-differential-characteristic determining unit 14 operates, the final output is locked while the external fault is being detected. When the saturation of the CT is dissolved during that time period, an unnecessary relay operation by the CT saturation can be prevented.

As explained above, according to this embodiment, a fault is detected based on the change level ΔIA of the magnitude of the current value IA of the maximum current terminal, and it is detected that the detected fault is an external fault since the operation level Id is equal to or smaller than the certain value relative to the suppression level Ir. This suppresses an output in the ratio differential characteristic for a certain time period, and thus it becomes possible to suppress an unnecessary operation even if the CT is saturated by the external fault.

[4. Fourth Embodiment]
[4-1. Configuration]

Figure 7:
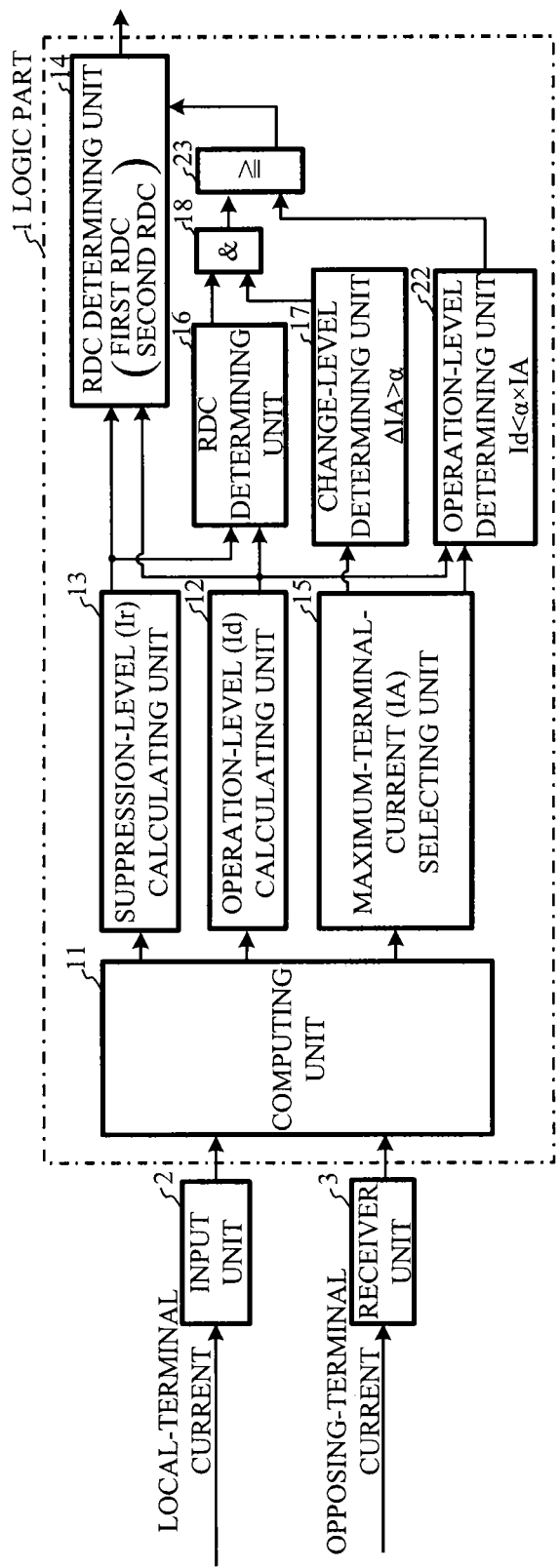
FIG. 7 is a block diagram illustrating a logic part of a current differential relay apparatus according to a fourth embodiment.

A fourth embodiment will now be explained with reference to FIG. 7. This embodiment basically employs the same configuration as that of the second embodiment illustrated in FIG. 3. However, this embodiment differs where the logic part includes an operation-level determining unit 22 and an OR operator 23.

The operation-level determining unit 22 is means for checking that the operation level Id which is a vector sum is smaller than the maximum current. When currents in the same direction are added together, the operation level Id becomes large, and when currents in the opposite directions are added together, the operation level becomes small. In the case of an external fault, the currents to be added together are in the opposite directions, and thus the operation level Id tends to be small.

[4-2. Working and Advantage]

In the case of a normal external fault, the amount of output current is the same as the amount of input current, and thus the operation level Id becomes zero. When, however, a CT saturation occurs, even if the operation level Id is obtained, some of the current amount cannot be canceled, and thus the operation level does not become zero. However, since the directions are opposite, the operation level Id becomes small to some level in comparison with the current amount IA of the maximum current terminal. Hence, when the operation level determining unit 22 checks that the operation level Id is smaller than the maximum current IA, it means that an external fault occurs.

Conversely, an output by the AND operator 18 is also a detection of the external fault. The calculation of the AND operator 18 is intended to detect the external fault before the CT is saturated. Hence, when an OR operation is performed in the OR operator 23 on the output by the AND operator 18 and the output by the operation-level determining unit 22, it becomes possible to keep detecting the external fault in both before and after the CT saturation occurs. The ratio-differential-characteristic determining unit 14 switches the ratio differential characteristic in the case of the external fault by the result of the OR operation likewise the second embodiment.

As explained above, according to this embodiment, a fault is detected based on the change level ΔIA of the magnitude of the current value IA of the maximum current terminal, and it is detected that the detected fault is an external fault since the operation level Id is equal to or smaller than the certain value relative to the suppression level Ir and the operation level Id is smaller than the magnitude of the current value IA of the maximum current terminal. Accordingly, by changing the ratio differential characteristic to the second ratio differential characteristic that makes the operation difficult in comparison with the normal case, it becomes possible to suppress an unnecessary operation even if the CT is saturated by the external fault.

[5. Fifth Embodiment]
[5-1. Configuration]

Figure 8:
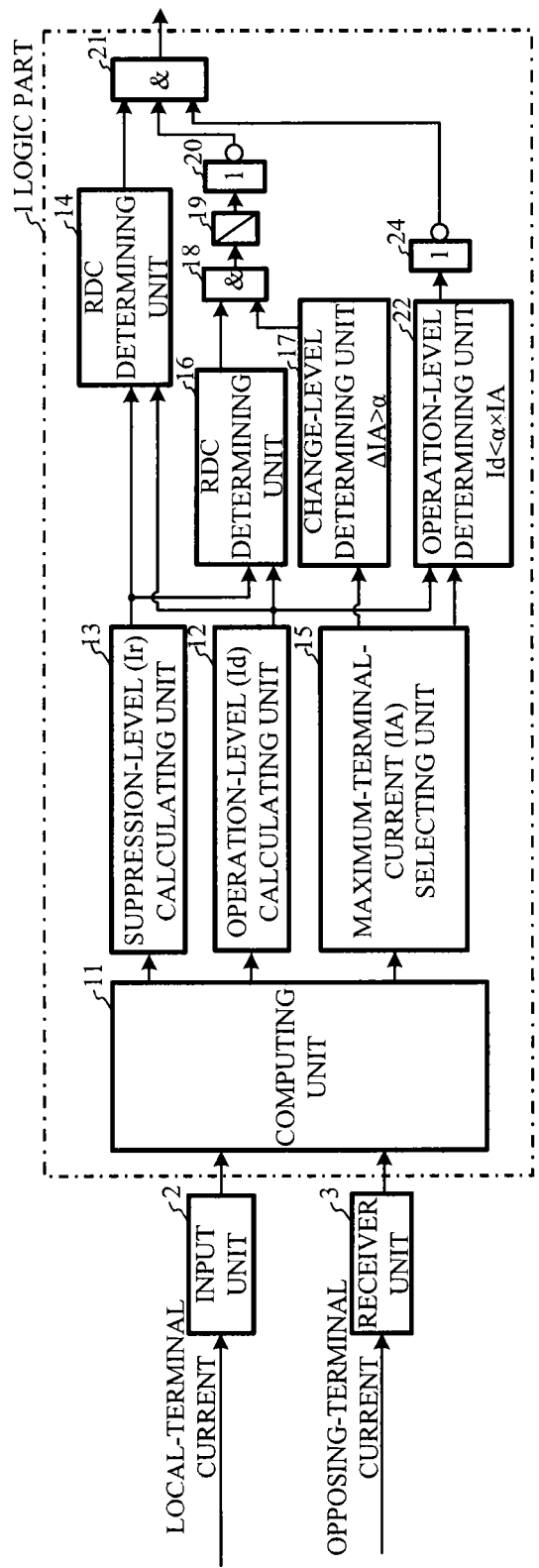
FIG. 8 is a block diagram illustrating a logic part of a current differential relay apparatus according to a fifth embodiment.

An explanation will now be given of a fifth embodiment with reference to FIG. 8. This embodiment basically employs the same configuration as that of the third embodiment illustrated in FIG. 6. However, this embodiment differs where the logic part includes the operation-level determining unit 22 and an inverting unit 24.

The operation-level determining unit 22 is the same as the operation-level determining unit 22 of the fourth embodiment, and detects that the operation level Id which is a differential current is smaller than the current IA of the maximum terminal, thereby detecting an external fault. The inverting unit 24 is means for inverting an output by the operation-level determining unit 22, and becomes ON when the operation-level determining unit 22 detects no external fault. This signal enters the AND operator 21. The inverting unit 24 and the AND operator 21 configures an extending unit.

[5-2. Working and Advantage]

According to this embodiment explained above, an output by the ratio-differential-characteristic determining unit 14 can be eventually ON while no external fault is detected by the operation-level determining unit 22 in addition to the time period that no external fault is detected by the AND operator 18. As a result, even if a CT saturation occurs by the external fault, a continuation to the final operation can be prevented.

As explained above, according to this embodiment, a fault is detected based on the change level ΔIA of the magnitude of the current value IA of the maximum current terminal, and it is detected that the detected fault is an external fault since the operation level Id is equal to or smaller than the certain value relative to the suppression level Ir and the operation level Id is smaller than the magnitude of the current value IA of the maximum current terminal. Accordingly, by suppressing an output in the ratio differential characteristic for a certain time period, it becomes possible to suppress an unnecessary operation even if the CT is saturated by the external fault.

[6. Sixth Embodiment]
[6-1. Configuration]

A sixth embodiment will now be explained with reference to FIG. 9. This embodiment basically employs the same configuration as that of the second embodiment illustrated in FIG. 3. However, this embodiment differs where the logic part includes an operation-level determining unit 25.

The operation-level determining unit 25 is means for checking that the operation level Id which is a vector sum is larger than the maximum current. As explained in the fourth embodiment, in the case of an external fault, even if a CT saturation occurs, the operation level Id becomes smaller than the current amount IA of the maximum current terminal.

Conversely, in the case of an internal fault, the operation level Id becomes equal to or larger than the maximum current terminal. The operation level becomes equal in a case in which only one terminal is provided with a power source, and a case of a one-sided terminal input. When a plurality of terminals has power sources, the operation level Id becomes larger than the current IA of the maximum current terminal.

Hence, when the operation-level determining unit 25 determines that the operation level Id is equal to or larger than the current amount IA of the maximum current terminal, it means that an internal fault occurs. When a signal by the operation-level determining unit 25 is valid, the ratio-differential-characteristic determining unit 14 switches (changes over) the ratio differential characteristic to the first ratio differential characteristic even if it has been changed to the second ratio differential characteristic, and performs determination.

[6-2. Working and Advantage]

According to this embodiment explained above, when an external fault occurs and it advances to an internal fault, first, the ratio-differential-characteristic determining unit 16, the operation-level determining unit 17, and the AND operator 18 detect the external fault. This results in the second ratio differential characteristic that makes an operation difficult in the ratio-differential-characteristic determining unit 14.

In the second ratio differential characteristic, an operation can be disabled in the case of, for example, a fault accompanying with a resistance or when a power-source phase difference is large. In such cases, when the operation-level determining unit 25 detects an internal fault, the ratio differential characteristic is returned to the normal first ratio differential characteristic, and a determination is made, thereby obtaining an operation result originally expected.

As explained above, according to this embodiment, a fault is detected based on the change level ΔIA of the magnitude of the current value IA of the maximum current terminal, and it is detected that the detected fault is an external fault since the operation level Id is equal to or smaller than the certain value relative to the suppression level Ir. When the fault advances to an internal fault even if the ratio differential characteristic has been switched to the second ratio differential characteristic that makes an operation difficult in comparison with the normal case, the operation level Id is equal to or greater than the certain value relative to the suppression level Ir, and thus the internal fault is detectable.

Hence, by returning the ratio differential characteristic to the normal first ratio differential characteristic, it becomes possible to avoid an unnecessary operation delay and an unsuccessful detection in the case of an advanced fault from the external fault to the internal fault while maintaining a characteristic durable against the CT saturation by the external fault. As a modified example of FIG. 9, when a determination by the operation-level determining unit 25 becomes valid, an operation can be performed without returning to the normal condition.

[7. Seventh Embodiment]

[7-1. Configuration]

Figure 10:
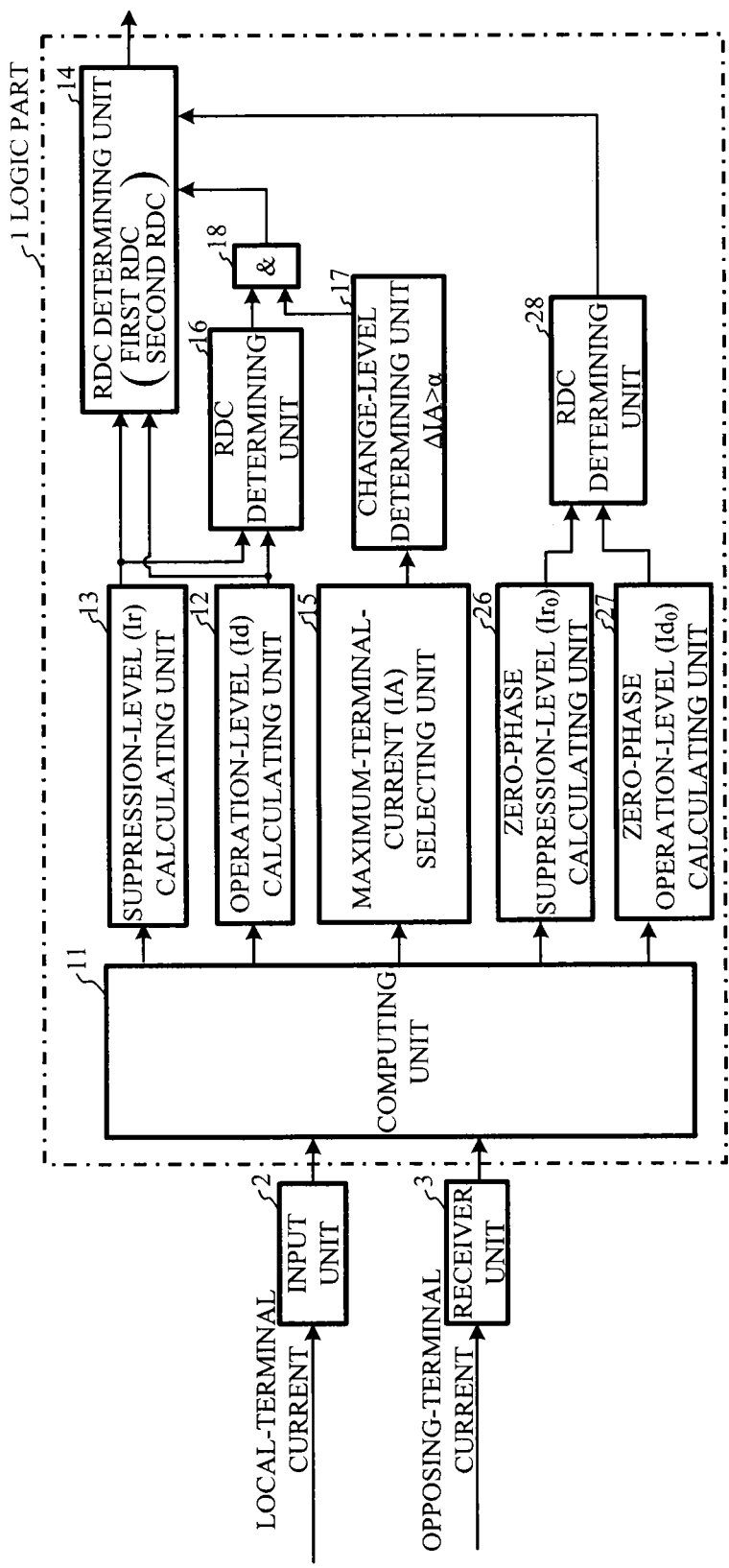
FIG. 10 is a block diagram illustrating a logic part of a current differential relay apparatus according to a seventh embodiment.

An explanation will be given of a seventh embodiment with reference to FIG. 10 and FIG. 11. This embodiment basically employs the same configuration as that of the second embodiment illustrated in FIG. 3. However, this embodiment differs Where the logic part includes a zero-phase suppression-level calculating unit 26, a zero-phase operation-level calculating unit 27, and a ratio-differential-characteristic determining (RDC) unit 28.

The zero-phase suppression-level calculating unit 26 is means for obtaining a zero-phase suppression level $Ir_0$ that is a scalar sum obtained by adding the magnitudes of zero-phase currents at respective terminals together. This is the same as the case in which the input of the suppression-level calculating unit 13 becomes a zero-phase current. The zero-phase current can be obtained as a sum of the currents in respective phases. When a circuit that obtains the zero-phase current amount is attached to a hardware resource, the value of that amount can be directly used.

The zero-phase operation-level calculating unit 27 is means for obtaining a zero-phase operation level $Ir_0$ that is a vector sum obtained by adding zero-phase currents of respective terminals together in a vector manner. The ratio-differential-characteristic determining unit 28 can combine the ratio differential characteristics like the ratio-differential-characteristic determining unit 14 by using the zero-phase suppression level $Ir_0$ and the zero-phase operation level $Id_0$ of this zero-phase current.

Figure 11:
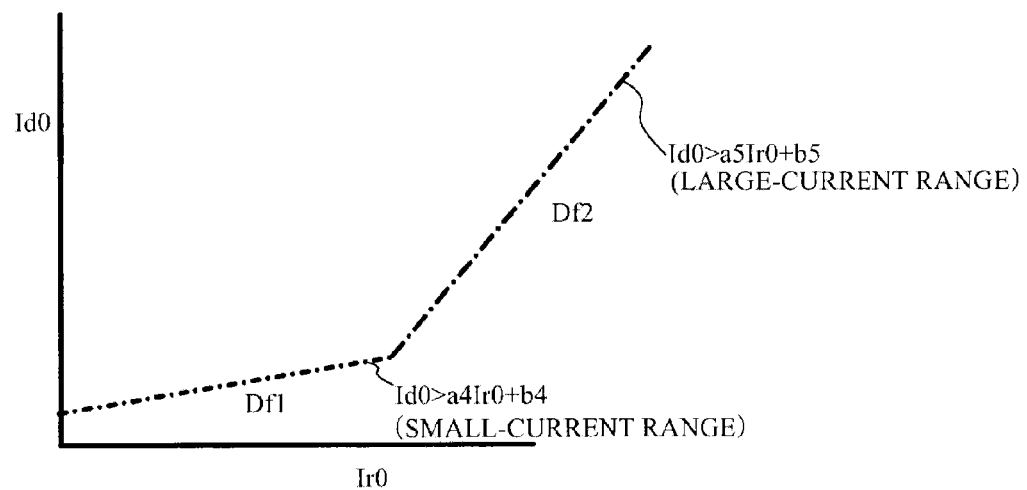
FIG. 11 is an explanatory diagram illustrating an example ratio differential characteristic of a ratio-differential-characteristic determining unit 28 in the logic part in FIG. 10.

This example is the ratio differential characteristic illustrated in FIG. 11. The formula of the characteristic is basically the same as those of the first and second ratio differential characteristics, and can be expressed by a formula $Id_0 > a_4 Ir_0 + b_4$. Moreover, this ratio differential characteristic may also have a large-current-range characteristic expressed by a formula $Id_0 > a_5 Ir_0 + b_5$, but may have only the above-explained small-current-range characteristic.

[7-2. Working and Advantage]

According to this embodiment explained above, only a fault current component can be taken out by utilizing the ratio differential characteristic on the basis of the zero-phase current. Hence, it becomes possible to detect a fault with high sensitivity without being affected by a load current.

In the case of, for example, a high-resistance grounding fault, a tidal current component is contained in the suppression level Ir and the fault current becomes small in the normal ratio differential, and thus the detection sensitivity becomes poor. When, in particular, the tidal current is large and the fault resistance increases, detection becomes difficult. However, by utilizing the zero-phase current component like this embodiment, the negative effect of the tidal current can be eliminated, and thus a high sensitivity can be maintained. That is, in the ratio-differential-characteristic determining unit 28, the utilization of the ratio differential characteristic on the basis of the zero phase enables a detection of an internal fault with high sensitivity.

The result from the ratio-differential-characteristic determining unit 28 is utilized for a selection of the first or second ratio differential characteristic in the ratio-differential-characteristic determining unit 14, and the ratio differential characteristic is returned to the first ratio differential characteristic to carryout a determination. That is, in a case in which the external fault advances to the internal fault, and even if the second ratio differential characteristic that makes an operation difficult is selected because of the first external fault, when the ratio-differential-characteristic determining unit 28 detects the internal fault, the determination can be carried out with the ratio differential characteristic being returned to the first ratio differential characteristic that is the normal condition. Accordingly, even if the internal fault is a case like a high-resistance grounding fault, an operation result that is expected originally can be obtained.

As explained above, according to this embodiment, a fault is detected based on the change level ΔIA of the magnitude of the current value IA of the maximum current terminal, and it is detected that the detected fault is an external fault since the operation level Id is equal to or smaller than the certain value relative to the suppression level Ir. Hence, the ratio differential characteristic has been changed to the second ratio differential characteristic that makes an operation difficult in comparison with the normal case in some cases. In this case, however, the ratio differential characteristic utilizing the operation level $Id_0$ on the basis of the zero phase and the suppression level $Ir_0$ on the basis of the zero phase is utilized to detect an internal fault with high sensitivity, thereby returning the ratio differential characteristic to the first ratio differential characteristic that is the normal condition. Accordingly, it becomes possible to suppress an unnecessary operation delay and an unsuccessful detection in the case of an advanced fault from the external fault to the internal fault while maintaining a characteristic durable against the CT saturation by the external fault.

Figure 12:
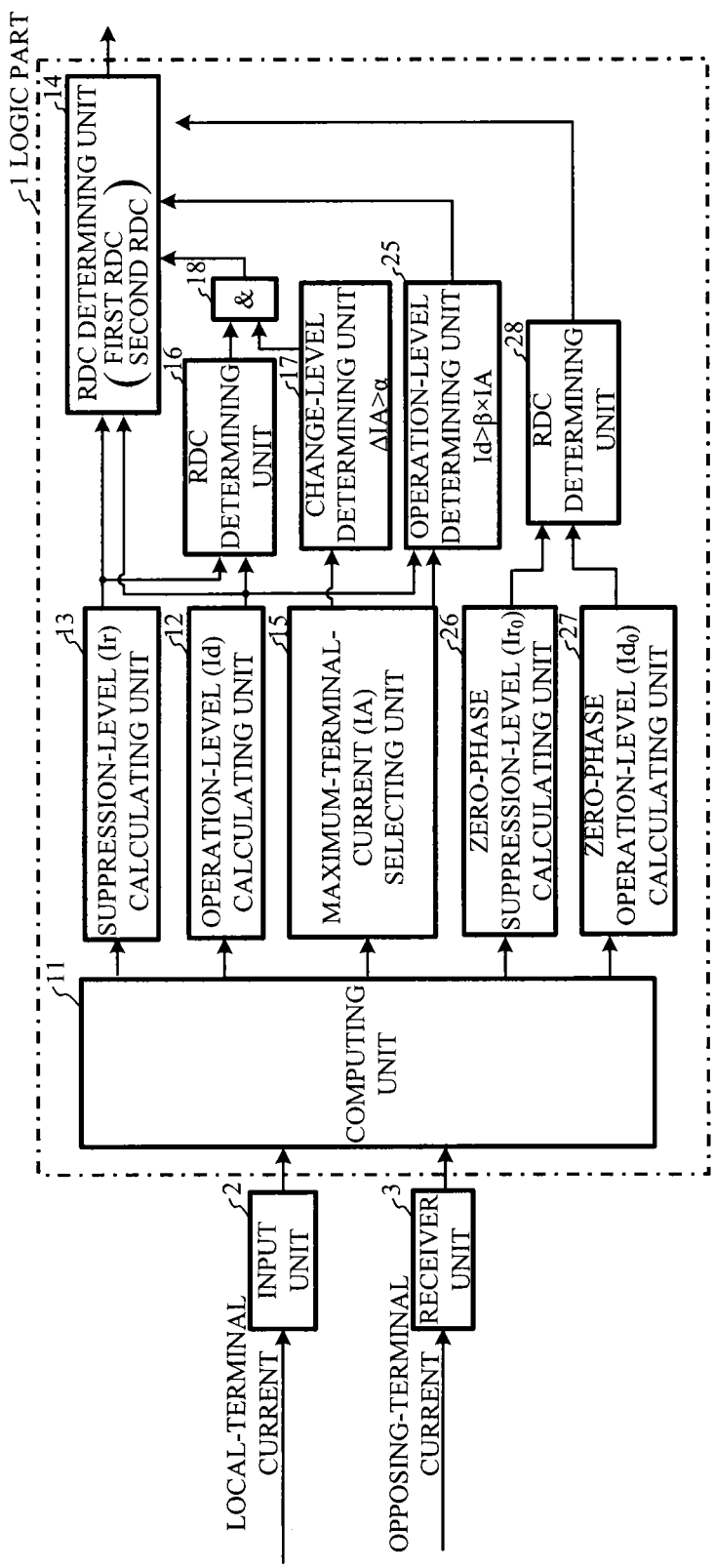
FIG. 12 is a block diagram illustrating a logic part of a current differential relay apparatus according to an eighth embodiment.

The switching of the ratio differential characteristics on the basis of the zero-phase current ratio differential can be carried out simultaneously with the sixth embodiment. In this case, a configuration illustrated in FIG. 12 is employed. This is a configuration illustrated in FIG. 9 added with the zero-phase suppression-level calculating unit 26, the zero-phase operation-level calculating unit 27, and the ratio-differential-characteristic determining unit 28, and the advantage and the logic are obvious, so that the explanation thereof will be omitted.

The parallel utilization enables a division of roles such that the operation-level determining unit 25 detects an internal fault accompanying with a normal large current and the zero-phase suppression-level calculating unit 26, the zero-phase operation-level calculating unit 27, and the ratio-differential-characteristic determining unit 28 are used for detecting a high-resistance fault, etc. As a modified example of FIG. 12, when a determination by the operation-level determining unit 25 is valid, an operation may be carried out without returning the ratio differential characteristic to the normal condition.

[8. Eighth Embodiment]
[8-1. Configuration]

Figure 13:
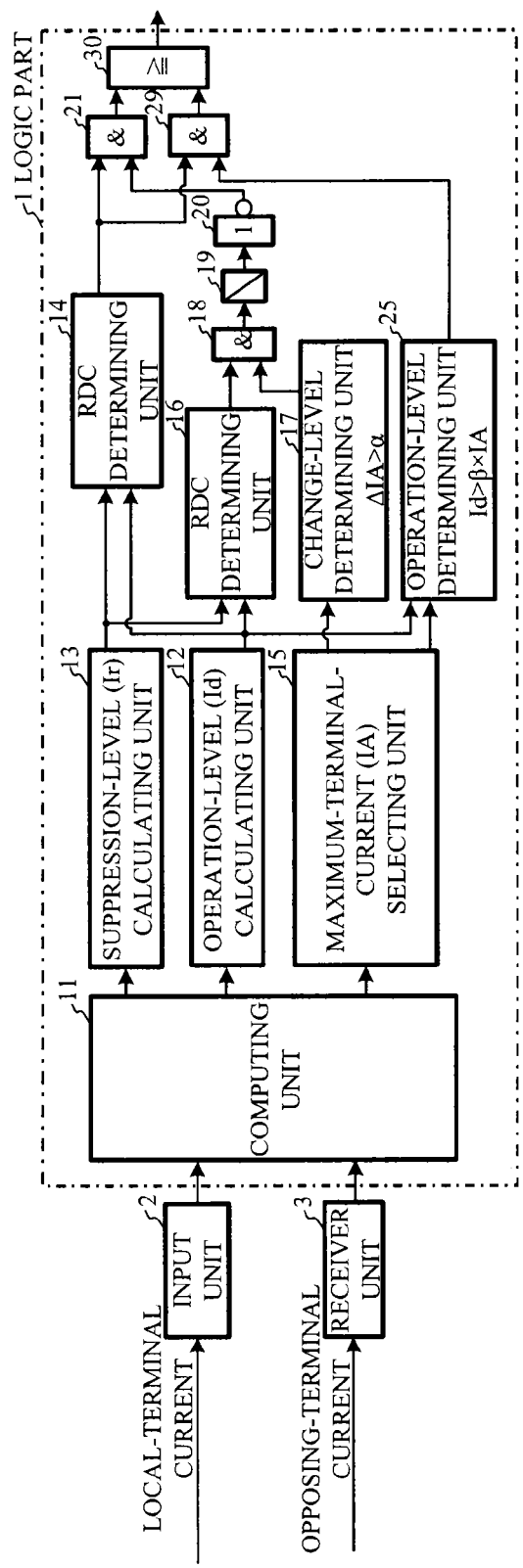
FIG. 13 is a block diagram illustrating a logic part of a current differential relay apparatus that is another example of the eighth embodiment.

An eighth embodiment will be explained with reference to FIG. 13. As illustrated in FIG. 13, this embodiment basically employs the same configuration as that of the third embodiment illustrated in FIG. 6. However, this embodiment differs where the logic part includes the operation-level determining unit 25, an AND operator 29, and an OR operator 30.

Figure 9:
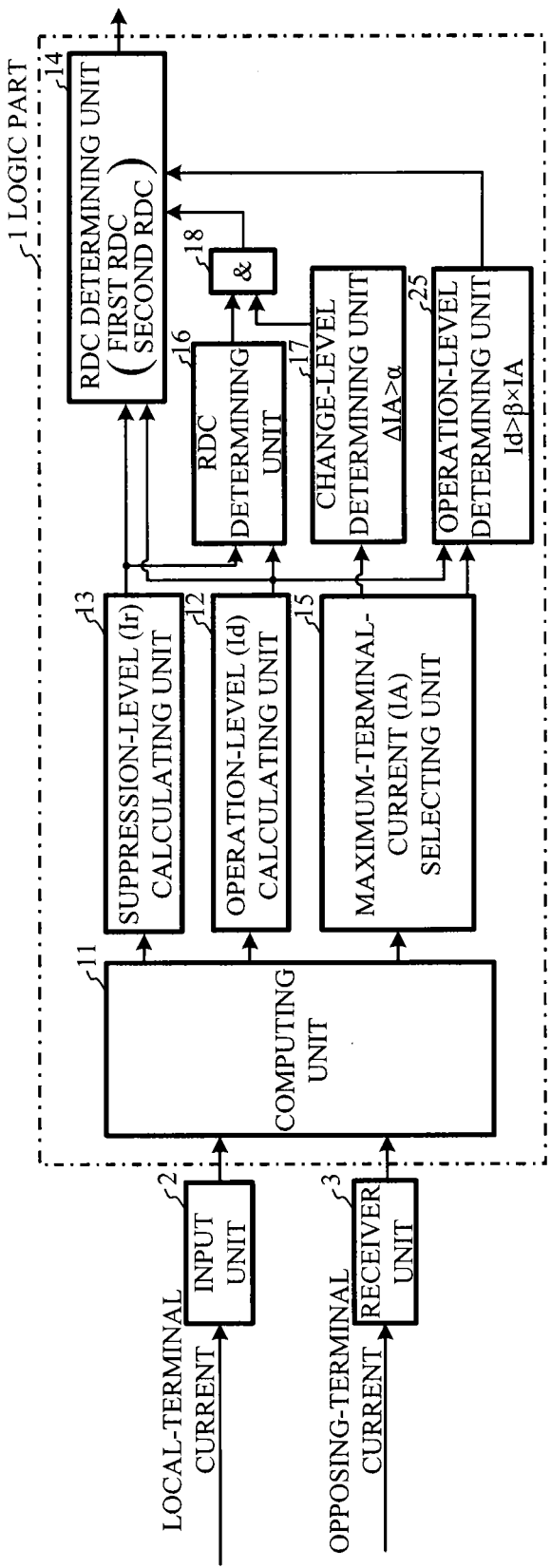
FIG. 9 is a block diagram illustrating a logic part of a current differential relay apparatus according to a sixth embodiment.

The operation-level determining unit 25 is the same as that of the sixth embodiment illustrated in FIG. 9, and detects an internal fault. The AND operator 29 changes an output to be ON when both ratio-differential-characteristic determining unit 14 and operation-level determining unit 25 that detects an internal fault are activated. The OR operator 30 changes, when either one of an output by the AND operator 21 and that of the AND operator 29 becomes ON, an output to be ON. The AND operator 29 and the OR operator 30 configure a canceling unit.

[8-2. Working and Advantage]

According to this embodiment explained above, when an output by the AND operator 21 is suppressed by an external fault detecting unit mainly configured by the ratio-differential-characteristic determining unit 16, the change-level determining unit 17 and the AND operator 18, if the operation-level determining unit 25 that detects an internal fault is activated, a signal of the final operation can be output based on the ratio differential characteristic of the ratio-differential-characteristic determining unit 14. That is, when an external fault advances to an internal fault, even if the output is blocked by the first external fault, a relay can be operated immediately as long as an internal fault is detected.

As explained above, according to this embodiment, a fault is detected based on the change level ΔIA of the magnitude of the current value IA of the maximum current terminal, and it is detected that the detected fault is an external fault since the operation level Id is equal to or smaller than the certain value relative to the suppression level Ir. Hence, even if the output based on the ratio differential characteristic is locked for a certain time period, when the fault advances to the internal fault, the internal fault can be detected since the operation level Id is equal to or greater than the certain value relative to the suppression level Ir.

At this time, by releasing the locking, it becomes possible to suppress an unnecessary operation delay and an unsuccessful detection in the case of the advanced fault from the external fault to the internal fault while maintaining a characteristic durable against the CT saturation by the external fault. As a modified example of FIG. 13, when the determination by the operation-level determining unit 25 is valid, an operation may be carried out without returning the ratio differential characteristic to be the normal condition.

[9. Ninth Embodiment]
[9-1. Configuration]

Figure 14:
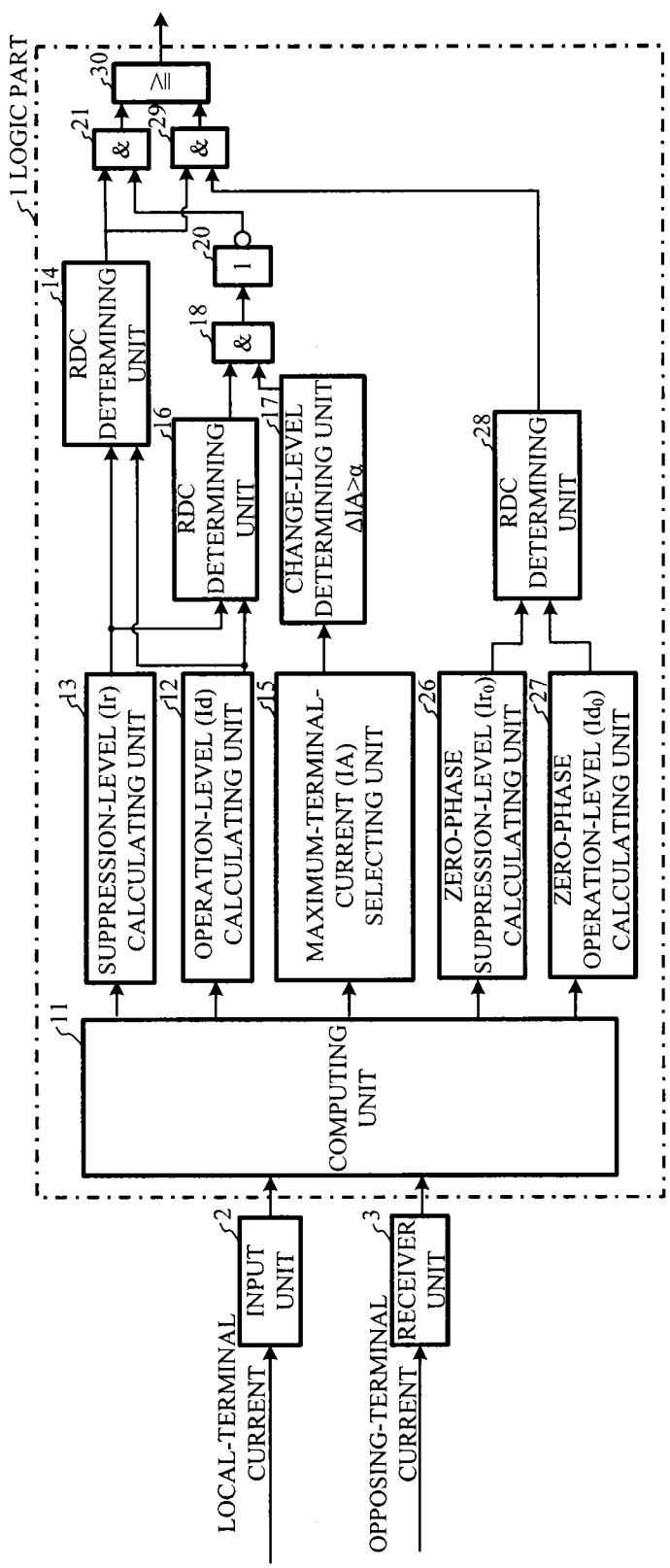
FIG. 14 is a block diagram illustrating a logic part of a current differential relay apparatus according to a ninth embodiment.

An explanation will now be given of a ninth embodiment with reference to FIG. 14. This embodiment basically employs the same configuration as that of the third embodiment illustrated in FIG. 6. However, this embodiment differs where the logic part includes the zero-phase suppression-level calculating unit 26, the zero-phase operation-level calculating unit 27, the ratio-differential characteristic determining unit 28, the AND operator 29, the OR operator 30, and an OR operator 31. The zero-phase suppression-level calculating unit 26, the zero-phase operation-level calculating unit 27, and the ratio-differential-characteristic determining unit 28 are the same as those of the seventh embodiment illustrated in FIG. 10, and a ratio-differential-characteristic determination based on the zero-phase current is enabled. Accordingly, an internal fault can be detected highly sensitively.

The AND operator 29 is means for taking AND of the output by the ratio-differential-characteristic determining unit 14 and that of the zero-phase ratio-differential-characteristic determining unit 28. The OR operator 30 is means for taking OR of the output by the AND operator 21 and the output by the AND operator 29.

[9-2. Working and Advantage]

According to this embodiment explained above, even when the output by the AND operator 21 is suppressed by an external fault detecting unit mainly configured by the ratio-differential-characteristic determining unit 16, the change-level determining unit 17, and the AND operator 18, as long as the internal fault detecting unit by the zero-phase suppression-level calculating unit 26, the zero-phase operation-level calculating unit 27, and the ratio-differential-characteristic determining unit 28 is activated, a signal of the final operation can be taken out based on the ratio differential characteristic of the ratio-differential-characteristic determining unit 14. That is, when the external fault advances to the internal fault and even when the output is locked by the first external fault, relay can operate immediately as long as the internal fault is detected.

As explained above, according to this embodiment, a fault is detected based on the change level ΔIA of the magnitude of the current value IA of the maximum current terminal, and it is detected that the detected fault is an external fault since the operation level Id is equal to or smaller than the certain value relative to the suppression level Ir. Hence, even if the output based on the ratio differential characteristic is locked for a certain time period, the ratio differential characteristic utilizing the operation level $Id_0$ on the basis of the zero phase and the suppression level $Ir_0$ on the basis of the zero phase is applied to detect an internal fault with high sensitivity, thereby returning the ratio differential characteristic to the ratio differential characteristic of the normal case. Accordingly, it becomes possible to suppress an unnecessary operation delay and an unsuccessful detection in the case of the advanced fault from the external fault to the internal fault while maintaining a characteristic durable against the CT saturation by the external fault.

Figure 15:
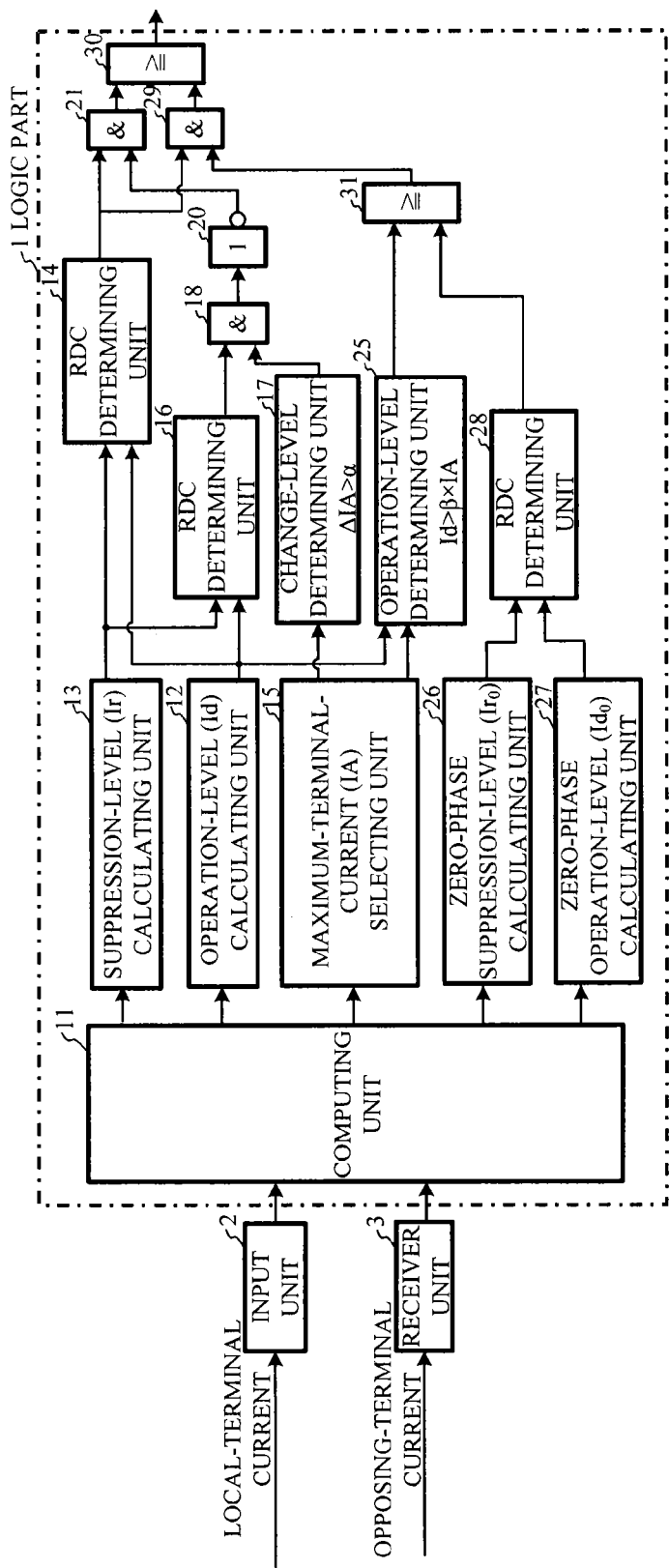
FIG. 15 is a block diagram illustrating a logic part of a current differential relay apparatus that is another example of the ninth embodiment.
Figure 16:
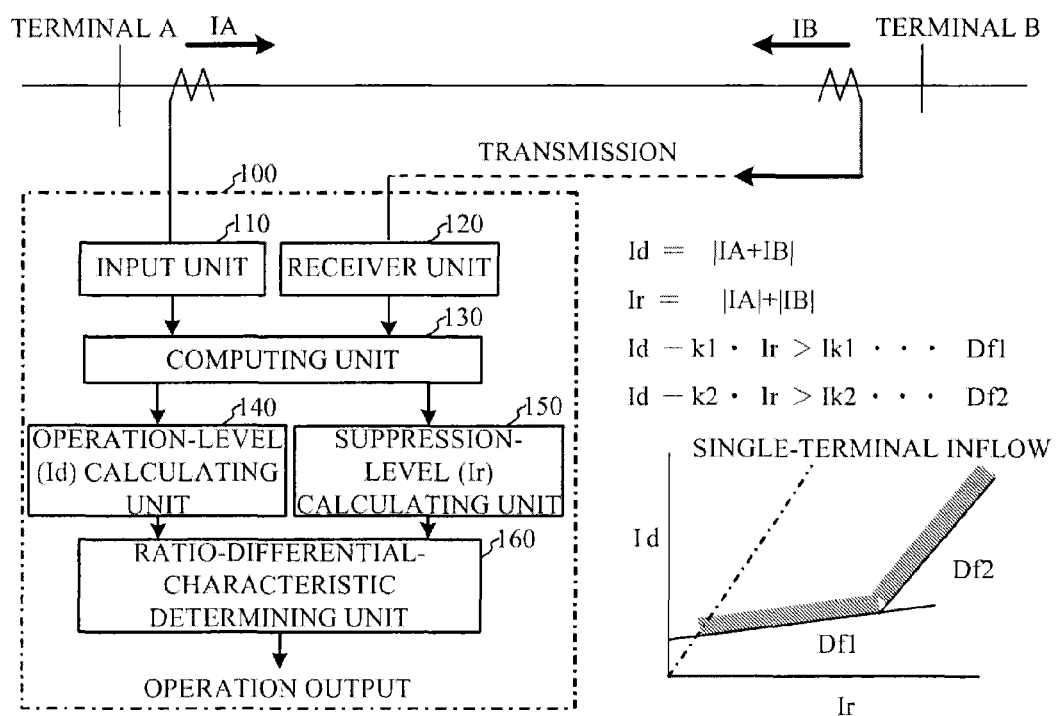
FIG. 16 is a block diagram illustrating an example conventional current differential relay apparatus and is an explanatory diagram for explaining a ratio differential characteristic.

The releasing of the ratio differential locking by the zero-phase current ratio differential can be simultaneously carried out with the eighth embodiment. In this case, a configuration illustrated in FIG. 15 is employed. This is a configuration illustrated in FIG. 14 added with the operation-level determining unit 25, and the OR operator 31, and the advantage and the logic are obvious, so that the explanation thereof will be omitted. The parallel utilization enables a division of roles such that the operation-level determining unit 25 detects an internal fault accompanying with a normal large current and the zero-phase suppression-level calculating unit 26, the zero-phase operation-level calculating unit 27, and the ratio-differential-characteristic determining unit 28 are used for detecting a high-resistance fault, etc. As a modified example of FIG. 15, when a determination by the operation-level determining unit 25 is valid, an operation may be carried out without returning the ratio differential characteristic to the normal condition.

[10. Other Embodiments]

Several embodiments were explained above, but those embodiments are presented as examples and are not intended to limit the scope and spirit of the invention. Those novel embodiments can be carried out in other various forms, and permit various omission, replacement and modification without departing from the scope and spirit of the invention. Such embodiments and modifications thereof are within the scope and spirit of the present invention, and are within the range of the invention set forth in appended claims and equivalents thereto. Various embodiments can be realized by appropriately combining multiple components disclosed in respective above-explained embodiments. Several components may be omitted from the whole components disclosed in respective above-explained embodiments.

For example, specific contents and values of information utilized in the embodiments, such as an electrical quantity, a set value, and a threshold, are optional, and are not limited to any particular content and numeric value. In the embodiments, in a large-small determination and a matching-mismatching determination for a value, etc., it is also optional that a determination is carried out so as to include the value under the condition equal to or greater than or equal to or smaller than, or the determination is carried out so as, to exclude the value under the condition greater than or smaller than. Hence, terms "equal to or greater than" and "equal to or smaller than" in the appended claims can also be read as "greater than" and "smaller than", respectively, depending on the setting of a value.

Respective units of the current differential relay apparatus have functions that can be realized by, for example, controlling a computer with a predetermined program. In this case, the program realizes the functions of respective units by physically utilizing hardware resources of the computer, and such a program and a non-transiently recording medium having stored therein such a program are also an aspect of the invention in solo.

Moreover, means for storing and temporally possessing data, set values, and computing equations, etc., necessary for a communication and a data processing is realized by a memory unit set for a computer. All memory media available currently or in future, such as a register, a memory, and a disk, are applicable as the memory unit.

Furthermore, some of or all components of the current differential relay apparatus can be configured by, for example, an exclusive circuit. Various circuits, such as an ASIC for realizing respective functions, an IC chip like a CPU, other periphery circuits, and a system LSI integrating multiple functions, are available, and the foregoing circuit is not limited to any particular one. The same is true of the range between a hardware process and a software process.

The invention claimed is:

1. A current differential relay apparatus comprising:
an operation-level calculating unit that calculates an operation level Id which is a vector sum of a local-terminal current and a received opposing-terminal current;
a suppression-level calculating unit that calculates a suppression level Ir which is a scalar sum of the local-terminal current and the opposing-terminal current; and
a ratio-differential-characteristic determining unit that determines an operation in a ratio differential characteristic based on the operation level Id and the suppression level Ir,
wherein with relationships $a_1 \leq a_2$ and $b_1 \geq b_2$ being satisfied where $a_1$, $a_2$, $b_1$ and $b_2$ are real numbers, the current differential relay apparatus further comprises:
a first range determining unit which determines that a first range is activated when $Id > a_1 Ir + b_1$ is satisfied;
a second range determining unit which determines that a second range is activated when $Id > a_2 Ir + b_2$ is satisfied; and
operation determining means for determining that an operation is made in the ratio differential characteristic when both the first range and second range are activated and for continuing the operation until an operation in the first range is reset.

2. A current differential relay apparatus comprising:
an operation-level calculating unit that calculates an operation level which is a vector sum of a local-terminal current and a received opposing-terminal current;
a suppression-level calculating unit that calculates a suppression level which is a scalar sum of the local-terminal current and the opposing-terminal current;
a first ratio-differential-characteristic determining unit that determines an operation in a ratio differential characteristic based on a first relational expression;
a maximum-terminal-current selecting unit that selects a current value of a maximum-current terminal among terminals including the local terminal;
a change-level determining unit which determines that a change level of the current value of the maximum-current terminal selected by the maximum-terminal-current selecting unit is equal to or greater than a predetermined value;
a second ratio-differential-characteristic determining unit that determines an operation in a ratio differential characteristic based on a second relational expression; and
an external fault determining unit that determines an occurrence of an external fault based on determination results by the change-level determining unit and the second ratio-differential-characteristic determining unit.

3. The current differential relay apparatus according to claim 2, wherein the first ratio-differential-characteristic determining unit comprises a plurality of ratio differential characteristics with different levels of difficulty for an operation changed in accordance with a determination result by the external fault determining unit.

4. The current differential relay apparatus according to claim 2, further comprising:

a suppressing unit that suppresses an output in the first ratio differential characteristic for a certain time period based on a determination result by the external fault determining unit.

5. The current differential relay apparatus according to claim 2, further comprising:
an operation-level determining unit that determines a magnitude relationship between the current value of the maximum-current terminal and the operation level,
wherein the first ratio-differential-characteristic determining unit comprises a plurality of ratio differential characteristics with different levels of difficulty for an operation changed in accordance with a determination result by the external fault determining unit or a determination result by the operation-level determining unit.

6. The current differential relay apparatus according to claim 4, further comprising:
an operation-level determining unit that determines a magnitude relationship between the current value of the maximum-current terminal and the operation level; and
an extending unit which suppresses an output in the ratio differential characteristic by the first ratio-differential-characteristic determining unit in accordance with a determination result by the external fault determining unit, and which extends a time of a suppression in accordance with a determination result by the operation-level determining unit.

7. The current differential relay apparatus according to claim 2, further comprising:
an operation-level determining unit that determines a magnitude relationship between the current value of the maximum-current terminal and the operation level,
wherein the first ratio-differential-characteristic determining unit comprises a plurality of ratio differential characteristics with different levels of difficulty for an operation so as to be changed in accordance with a determination result by the external fault determining unit and returned in accordance with a determination result by the operation-level determining unit.

8. The current differential relay apparatus according to claim 3, further comprising:
a zero-phase operation-level calculating unit that calculates a zero-phase operation level which is a vector sum of a local-terminal zero-phase current and a received zero-phase current of the opposing terminal;
a zero-phase suppression-level calculating unit that calculates a zero-phase suppression level which is a scalar sum of the local-terminal zero-phase current and the opposing-terminal zero-phase current; and
a third ratio-differential-characteristic determining unit that determines a ratio differential characteristic based on a third relational expression between the zero-phase operation level and the zero-phase suppression level,
wherein the first ratio-differential-characteristic determining unit comprises the plurality of ratio differential characteristics with different levels of difficulty for an operation so as to be changed based on a determination result by the external fault determining unit and returned in accordance with a determination result by the third ratio-differential-characteristic determining unit.

9. The current differential relay apparatus according to claim 8, further comprising:
an operation-level determining unit that determines a magnitude relationship between the current value of the maximum-current terminal and the operation level; and
a canceling unit that cancels, when the suppressing unit suppresses the output by the first ratio-differential-characteristic determining unit, the suppression in accordance with a determination result by the operation-level determining unit.

10. The current differential relay apparatus according to claim 4, further comprising:
a zero-phase operation-level calculating unit that calculates a zero-phase operation level which is a vector sum of a local-terminal zero-phase current and a received zero-phase current of the opposing terminal;
a zero-phase suppression-level calculating unit that calculates a zero-phase suppression level which is a scalar sum of the local-terminal zero-phase current and the opposing-terminal zero-phase current;
a third ratio-differential-characteristic determining unit which determines that the zero-phase operation level is large based on a third relational expression between the zero-phase operation level and the zero-phase suppression level; and
a canceling unit that cancels, when the suppressing unit suppresses the output by the first ratio-differential-characteristic determining unit, the suppression in accordance with a determination result by the third ratio-differential-characteristic determining unit.

11. The current differential relay apparatus according to claim 4, further comprising:
an operation-level determining unit that determines a magnitude relationship between the current value of the maximum-current terminal and the operation level;
a zero-phase operation-level calculating unit that calculates a zero-phase operation level which is a vector sum of a local-terminal zero-phase current and a received zero-phase current of the opposing terminal;
a zero-phase suppression-level calculating unit that calculates a zero-phase suppression level which is a scalar sum of the local-terminal zero-phase current and the opposing-terminal zero-phase current;
a third ratio-differential-characteristic determining unit that determines a ratio differential characteristic based on a third relational expression between the zero-phase operation level and the zero-phase suppression level; and
a canceling unit that cancels, when the suppressing unit suppresses the output by the first ratio-differential-characteristic determining unit, the suppression in accordance with a determination result by the operation-level determining unit or a determination result by the third ratio-differential-characteristic determining unit.

12. The current differential relay apparatus according to claim 2, further comprising:
an operation-level determining unit that determines a magnitude relationship between the current value of the maximum-current terminal and the operation level,
wherein the first ratio-differential-characteristic determining unit comprises a plurality of ratio differential characteristics with different levels of difficulty for an operation so as to be changed in accordance with a determination result by the external fault determining unit and enabling a relay operation in accordance with a determination result by the operation-level determining unit when it is determined as an internal fault.

13. The current differential relay apparatus according to claim 7, further comprising:
a zero-phase operation-level calculating unit that calculates a zero-phase operation level which is a vector sum of a local-terminal zero-phase current and a received zero-phase current of the opposing terminal;

a zero-phase suppression-level calculating unit that calculates a zero-phase suppression level which is a scalar sum of the local-terminal zero-phase current and the opposing-terminal zero-phase current; and a third ratio-differential-characteristic determining unit that determines a ratio differential characteristic based on a third relational expression between the zero-phase operation level and the zero-phase suppression level, wherein the first ratio-differential-characteristic determining unit comprises the plurality of ratio differential characteristics with different levels of difficulty for an operation so as to be changed based on a determination result by the external fault determining unit and returned in accordance with a determination result by the third ratio-differential-characteristic determining unit.

14. The current differential relay apparatus according to claim 6, further comprising:

an operation-level determining unit that determines a magnitude relationship between the current value of the maximum-current terminal and the operation level; and a canceling unit that cancels, when the suppressing unit suppresses the output by the first ratio-differential-characteristic determining unit, the suppression in accordance with a determination result by the operation-level determining unit.

15. The current differential relay apparatus according to claim 6, further comprising:

an operation-level determining unit that determines a magnitude relationship between the current value of the maximum-current terminal and the operation level;

a zero-phase operation-level calculating unit that calculates a zero-phase operation level which is a vector sum of a local-terminal zero-phase current and a received zero-phase current of the opposing terminal;

a zero-phase suppression-level calculating unit that calculates a zero-phase suppression level which is a scalar sum of the local-terminal zero-phase current and the opposing-terminal zero-phase current;

a third ratio-differential-characteristic determining unit that determines a ratio differential characteristic based on a third relational expression between the zero-phase operation level and the zero-phase suppression level; and a canceling unit that cancels, when the suppressing unit suppresses the output by the first ratio-differential-characteristic determining unit, the suppression in accordance with a determination result by the operation-level determining unit or a determination result by the third ratio-differential-characteristic determining unit.

16. The current differential relay apparatus according to claim 7, further comprising:

an operation-level determining unit that determines a magnitude relationship between the current value of the maximum-current terminal and the operation level;

a zero-phase operation-level calculating unit that calculates a zero-phase operation level which is a vector sum of a local-terminal zero-phase current and a received zero-phase current of the opposing terminal;

a zero-phase suppression-level calculating unit that calculates a zero-phase suppression level which is a scalar sum of the local-terminal zero-phase current and the opposing-terminal zero-phase current;

a third ratio-differential-characteristic determining unit that determines a ratio differential characteristic based on a third relational expression between the zero-phase operation level and the zero-phase suppression level; and a canceling unit that cancels, when the suppressing unit suppresses the output by the first ratio-differential-characteristic determining unit, the suppression in accordance with a determination result by the operation-level determining unit or a determination result by the third ratio-differential-characteristic determining unit.

* * * * *